United States Patent [19]

Maloch

[11] Patent Number: 5,735,323
[45] Date of Patent: Apr. 7, 1998

[54] TREE CUTTER DEVICE

[76] Inventor: Brady Lee Maloch, Darlington Chain Saw, 1623 S. Main St., Darlington, S.C. 29532

[21] Appl. No.: 707,014

[22] Filed: Sep. 3, 1996

[51] Int. Cl.$^6$ ....................................... A01G 23/08
[52] U.S. Cl. .................. 144/34.1; 30/379.5; 144/4.1; 144/336
[58] Field of Search ................. 83/928; 30/379, 30/379.5; 144/4.1, 34.1, 335, 336

[56] References Cited

U.S. PATENT DOCUMENTS

| | | |
|---|---|---|
| 2,955,631 | 10/1960 | Hoadley . |
| 3,457,977 | 7/1969 | Andersson et al. . |
| 3,683,979 | 8/1972 | Waino et al. . |
| 3,726,326 | 4/1973 | Coleman . |
| 3,848,648 | 11/1974 | Dika et al. ................ 144/4.1 |
| 3,913,641 | 10/1975 | White . |
| 3,970,125 | 7/1976 | Muirhead et al. .......... 144/4.1 |
| 3,991,799 | 11/1976 | Altbright . |
| 4,090,540 | 5/1978 | Smith et al. . |
| 4,219,059 | 8/1980 | Albright . |
| 4,467,849 | 8/1984 | Denis . |
| 4,848,424 | 7/1989 | Wiemeri et al. ........... 144/34.1 |
| 4,998,573 | 3/1991 | York ........................... 144/4.1 |

FOREIGN PATENT DOCUMENTS

| | | |
|---|---|---|
| 960457 | 1/1975 | Canada . |
| 960940 | 1/1975 | Canada . |
| 181435 | 6/1966 | U.S.S.R. . |

*Primary Examiner*—W. Donald Bray
*Attorney, Agent, or Firm*—Michael J. McGreal

[57] ABSTRACT

The tree cutter device has a quick release mechanism for the gripping of the tree to be cut and for the quick release after cutting. The gripping mechanism is actuated upon contact of the tree cutter device with a tree with the gripping force with a tree at a maximum when the tree cutter device is fully against the tree. After cutting the tree, the gripping mechanism is released by the moving of the tree cutter away from the tree or by releasing the hydraulic or pneumatic cylinder driving the tree clamp in the non-mechanical modes. In the mechanical mode a combination of levers and tensioning springs comprise the tree gripping mechanism that is actuated by a trigger arm that is actuated by the contact of the tree cutter device with the tree. A boom arrangement biases the tree away from the tree cutter as it is being cut, and in a preferred mode includes a kick arm arrangement which at a lower end enters the cut as a tree is being cut and felled, holds the cut open, and forces the tree at the lower end away from the tree cutter and the operator.

24 Claims, 6 Drawing Sheets

FIG. 5

TREE CUTTER DEVICE

This invention relates to a tree cutter device. More particularly, this invention relates to a tree cutter device for cutting small to medium caliper trees.

BACKGROUND OF THE INVENTION

Most of the tree cutting devices of the category of this invention are vehicle mounted devices. The vehicle provides the stability for the tree cutter, it can provide pneumatic and/or electric power, and it provides a quick and efficient way to move the tree cutter from tree to tree. The tree usually will be cut as close to the base as possible. In addition, there usually will be a means to bias the tree to fall in a direction away from the tree cutter device. This will protect the persons who are cutting the tree and will prevent the saw from becoming wedged in the tree while the tree is being cut.

U.S. Pat. No. 3,913,641 discloses a tree cutter that is mounted to a tractor and which cuts the tree at the base. In U.S. Pat. Nos. 3,991,799; 4,219,059 and 4,467,849 there is a tree clamp combined with the tree cutter. In the devices of these patents, there is a tree clamp mechanism located above the cutter so that the tree can be held after cutting. In U.S. Pat. Nos. 3,457,977; 3,683,979; 3,726,326 and 3,848,648 there are disclosed tree cutter devices that have a combined tree pusher assembly. In these devices the tree is cut at the base, but above the base there is located an assembly to put a force on the tree in a particular direction as the tree is being cut. This assembly is in the nature of a pushing bar. The tree will be pushed away from the side being cut.

The tree cutter of the present invention has several advantages over these prior art tree cutters. The tree cutter of the present invention is primarily directed to trees having a small to mid-range caliper. It is adapted to quickly and automatically grip a tree at the base followed by the activation of the tree pusher member to bias the tree away from the tree cutter, which in turn is followed by the activation of the cutter which usually would be a chain saw. The mechanism to grip the tree is actuated by the contact of the tree cutter frame against the tree. Also as the tree cutter frame is pushed against the tree, the clamp mechanism increases the grip onto the tree. The net result is that when the tree cutter frame is snug against the tree, there is maximum gripping of the tree. As the tree cutter is moved away from the tree the clamp mechanism is automatically released.

BRIEF SUMMARY OF THE INVENTION

The tree cutter is primarily directed to the cutting of small to medium caliper trees. There are mechanical and hydraulic embodiments of the invention. The hydraulic embodiment can also function in a pneumatic mode with pneumatic drives replacing hydraulic drives. As used in this specification the term hydraulic is meant to likewise encompass pneumatic.

The tree cutter in a mechanical embodiment is comprised of a frame which supports a tree gripping means and a cutter means. It also can support a tree pusher or biasing means. In a mechanical embodiment the tree gripping means is comprised of an arcuate lever and tree clamp. The tree clamp is adapted to contact the tree. The arcuate lever is attached to the frame and activated by a trigger arm. A tensioning means such as a spring is attached to the trigger arm and the arcuate lever whereby the actuation of the trigger arm pivots the arcuate lever. The arcuate lever at a point distant from the attachment to the trigger arm is connected to the tree clamp. A tension means such as a spring biases the tree clamp into a position to grip a tree.

Projecting upwardly from the frame is a first boom. Attached to an upper part of the first boom is a second boom. The second boom is preferably pivotably attached to the first boom and is set at an angle of greater than 90° to the first boom. The second boom preferably is moved upwardly and downwardly by a pneumatic, hydraulic or other means so that when moved downwardly, it will place a force against the tree in a direction opposite to the frame.

The tree cutter in an hydraulic embodiment is similar to that of the mechanical embodiment. In this embodiment when the frame contacts the base of a tree a tree clamp is actuated hydraulically by the operator. The tree clamp is mounted on the frame and moves transversely in the frame to hold the tree below where it is to be cut. Like in the mechanical embodiment a first boom projects upwardly from the frame, and attached to an upper part of the first boom is a second boom. The second boom is preferably pivotably connected to the first boom and is set out at an angle of greater than 90 degrees to the first boom. The first boom is moved upwardly and downwardly by a hydraulic, pneumatic, or other means so that when moved downwardly it will place a force against the tree in a direction opposite to the frame.

Usually the frame in either embodiment is attached to a vehicle or other means to move the frame toward and away from a tree. It also will move the tree cutter from tree to tree.

Also in either embodiment a cutter such as a chain saw is mounted at the frame and is moved toward and away from the tree in the operation of the tree cutter device. The cutter is moved by means of a pneumatic, hydraulic or other means.

Optionally a kick arm can be a part of either embodiment. A kick arm is an arm that is pivotably mounted on the first boom for movement toward a tree as the tree is being cut. It preferably is mounted to the first boom at an upper part of the kick arm. Adjacent its upper end the kick arm is connected to the second boom by means of a flexible attachment. In operation as the second boom moves further downwardly as a tree is being cut and felled the kick arm pushes against the base of the tree and lifts the tree upwardly and away from the cutter frame. This allows the easy withdrawal of the of the chain saw and provides for a moving of the tree away from the tree cutter and the operator.

In the operation of the tree cutter an any embodiment, the frame is moved into contact with a tree to be cut. In the mechanical embodiment upon contact of the trigger arm with the tree, the arcuate lever and the clamp are actuated to thereby contact and grip the tree and stabilize the tree cutter against the base of the tree to be cut. In the hydraulic or pneumatic embodiment when the frame contacts a tree the operator actuates a hydraulic or pneumatic cylinder which moves the tree clamp into contact with the tree to grip the tree and to stabilize the tree cutter. The second boom is then actuated to place a force away from the frame on the tree at a point distant from the base of the tree. The cutter is then actuated whereby the tree is cut at the base. The second boom pushes the tree as it is being cut away from the tree cutter actuating the kick arm to raise the tree and to move it away from the tree cutter. The cutter is retracted and the frame moved away from the base of the tree. This releases the clamp that is gripping the base of the tree. The tree cutter device is then moved to cut another tree.

DETAILED DESCRIPTION OF THE INVENTION

The tree cutter can be in a mechanical embodiment, an hydraulic embodiment or a pneumatic embodiment. In any of these embodiments the general mode of operation is essentially the same. Also the structures are closely related with the difference primarily being the technique for gripping the tree to stabilize the tree cutter during operation.

Figure 1:
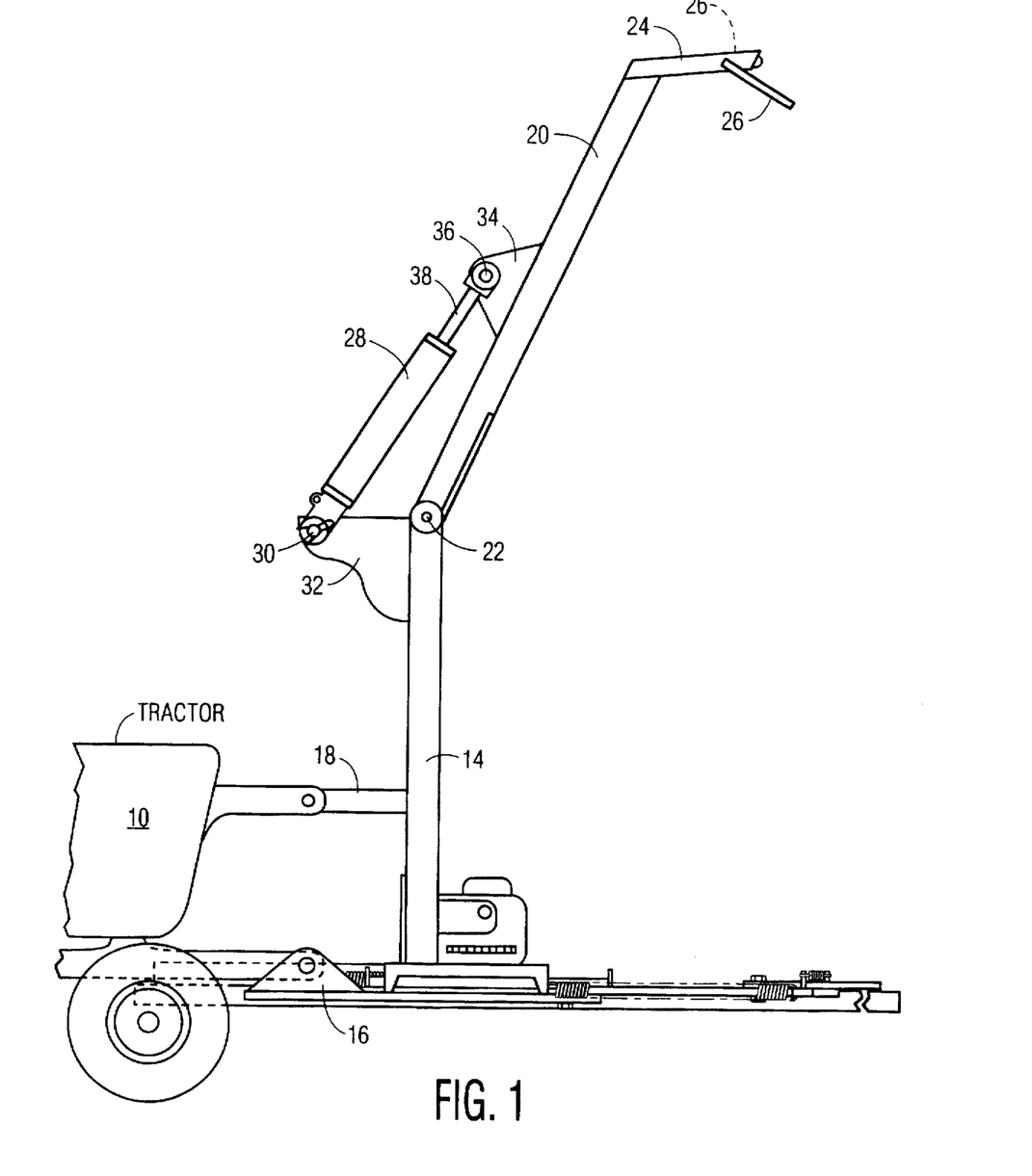
FIG. 1 is a side elevational view of the tree cutter device attached to a vehicle.
Figure 2:
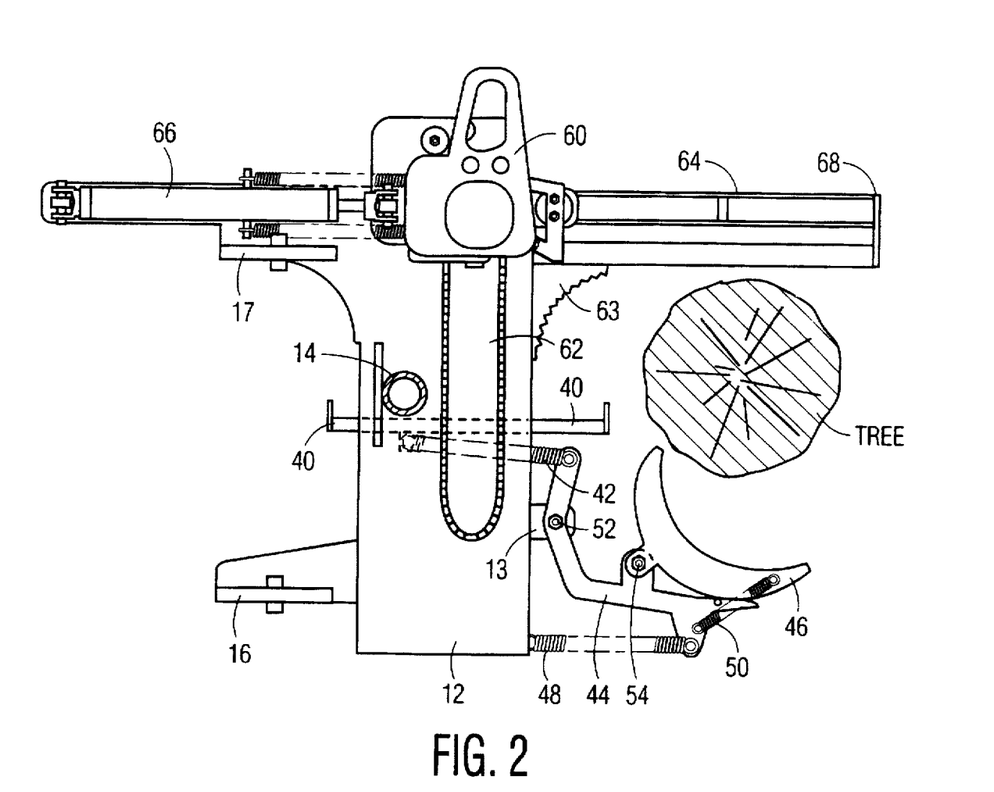
FIG. 2 is a top plan view of the tree cutter frame approaching a tree.
Figure 2A:
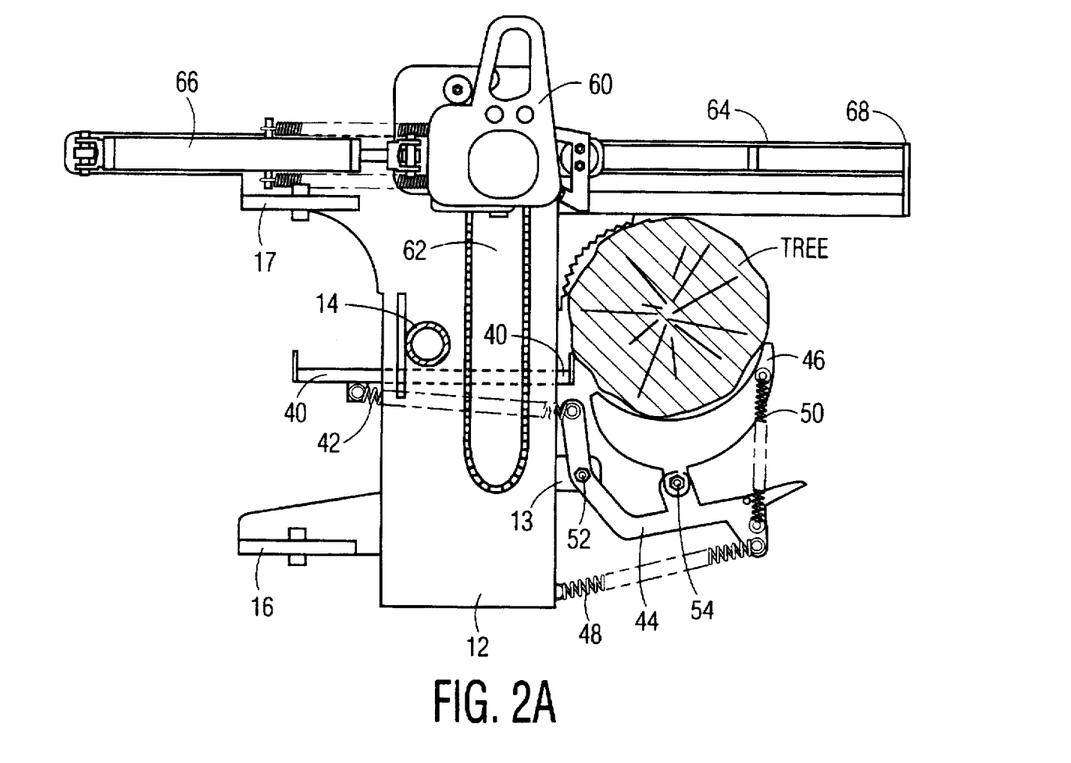
FIG. 2A is a top plan view of the tree cutter frame gripping a tree.

In FIG. 1, there is shown the tree cutter assembly mounted onto a vehicle 10. This vehicle can be a wheeled or track vehicle, and preferably is a tractor. The tree cutter in the mechanical mode(as shown in FIGS. 1, 2 and 2A) is comprised of frame 12 which has an upwardly extending boom 14. Extending from the frame toward the vehicle are mounting brackets 16 and 17. Extending from the boom 14 toward the tractor is mounting bracket 18. These mounting brackets are attached to the tractor by common screws and bolts. At the upper end of boom 14 is boom 20. Boom 20 is hingedly attached to boom 14 by means of hinge 22. This hinge essentially is a screw and bolt assembly. At the forward end of boom 20 is tree contacting members 26 supported by member 24. An hydraulic cylinder 28 is attached to the boom 14 at an upper bracket 32 by means of a cotter pin arrangement 30 and at a point near a forward part of boom 20 by means of another bracket 34 by means of a cotter pin arrangement 36. Nuts and bolts and other attachments can be used in place of the cotter pin arrangement. Shaft 38 moves inwardly and outwardly from hydraulic cylinder 28. In place of a hydraulic cylinder, a pneumatic cylinder as also an electric motor can be used.

In FIG. 2, there is shown a top plan view of the tree cutter frame 12. This frame attaches to the vehicle at brackets 16 and 17. Boom 14 extends upwardly from this frame. The tree clamping assembly is comprised of trigger arm 40, arcuate lever 44 and tree clamp 46. Arcuate lever 44 is attached to the frame by means of frame extension 13. This can be by a nut and bolt arrangement at 52. Tree clamp 46 is attached to the arcuate lever adjacent the other end of the arcuate lever. This can be by means of nut and bolt arrangement 54. Spring 42 is attached to trigger arm 40 and the arcuate lever 44 at an end point adjacent the attachment of the arcuate lever to the frame. This spring can be replaced by an hydraulic or pneumatic cylinder that will be actuated by trigger arm 40 and will move arcuate lever 44. In such a case, the trigger arm will actuate a valve controlling the hydraulic or pneumatic cylinder.

Spring 48 is connected to the frame 12 and the arcuate lever 44. Spring 50 is attached to the tree clamp 46 and the arcuate lever 44. On the opposite part of frame 12, there is mounted a chain saw 60 having a blade 62. This chain saw can move on tracks 64 to and from the end 68 of the frame. Hydraulic cylinder 66 is actuated to move the saw along track 64. In place of this hydraulic cylinder, a pneumatic cylinder, or an electric motor can be used. The tree clamp is shown adjacent a tree.

In FIG. 2A the tree frame of FIG. 2 is shown gripping a tree. At this point the chain saw is about to be activated. As shown in this FIG. 2A the trigger arm 40 has contacted the tree and been moved rearwardly. This has actuated spring 42 which has rotated arcuate lever 44 to place the tree clamp 46 in contact with the tree. At this point the tree contacts the brace 63. Also at this point the chain saw is actuated and moved along track 64 by hydraulic cylinder 66. When the tree has been cut the frame is moved away from the tree stump which in turn causes the tree clamp 46 to move away from the tree stump. This is caused by the tension on springs 48 and 50. The unit then will be moved to cut another tree.

Figure 3:
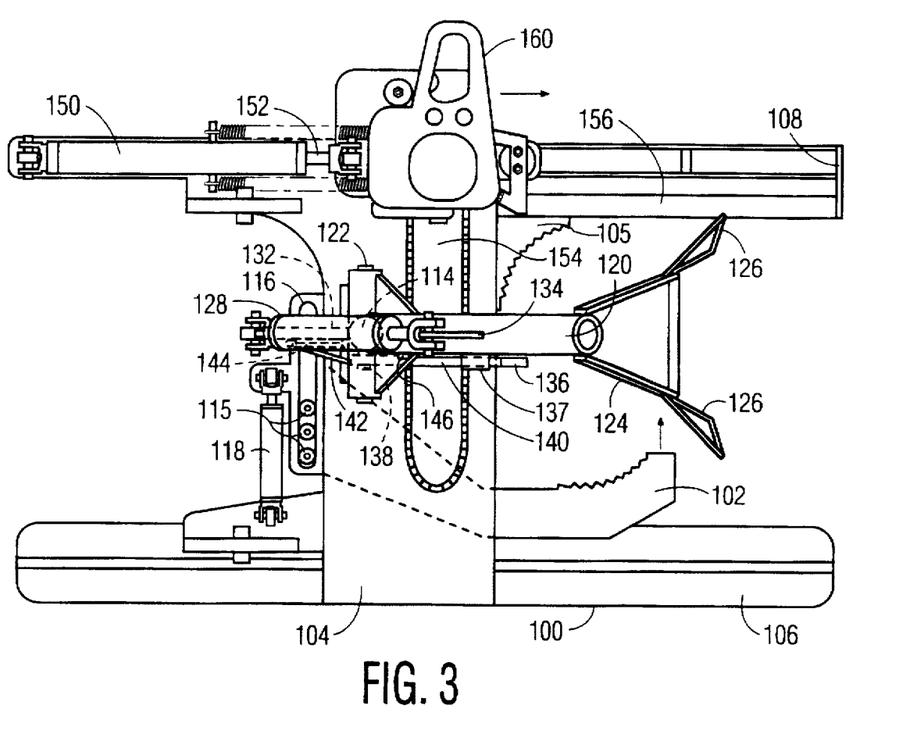
FIG. 3 is a top plan view of a second embodiment of the tree cutter device.
Figure 4:
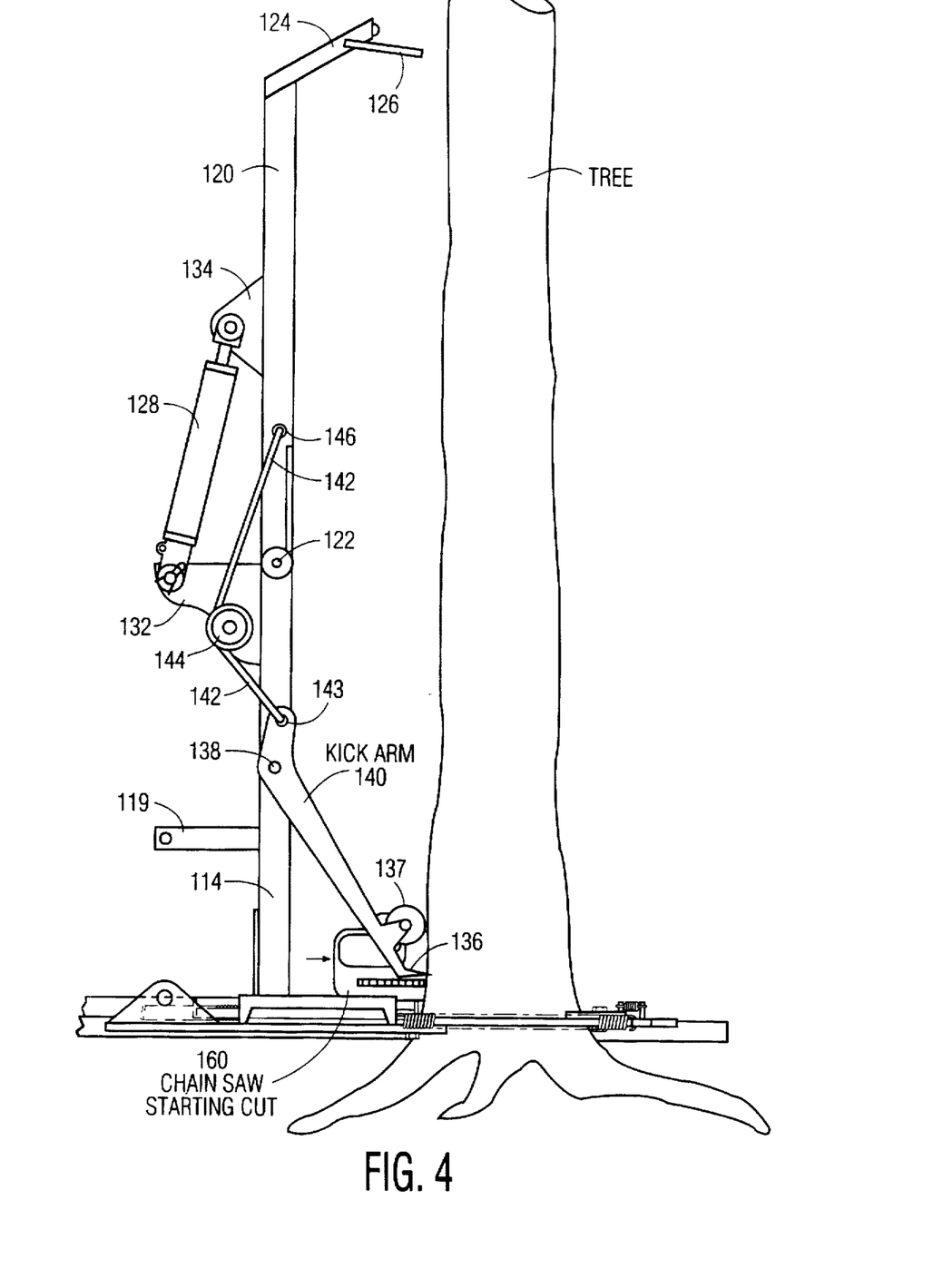
FIG. 4 is a side elevational view of the boom assembly of the tree cutter device of FIG. 3.

In FIG. 3 there is shown an hydraulic embodiment of the tree cutter apparatus. As seen in FIG. 3 there is a frame 100 which is comprised of skid plates 106 and 108 and crossbeam 104. The skid plates support the tree cutter on the ground. Extending upwardly from the crossbeam 104(as shown in FIG. 4) is the first boom 114. Attached to the first boom at an upper end is second boom 120. At the end of of the second boom are the tree gripper arms 126. The first boom and the second boom are pivotably connected at pin 122. The second boom 120 is moved with respect to the first boom 114 by means of hydraulic cylinder 128 which is attached to the first boom at bracket 132 and to the second boom at bracket 134.

The frame 100 supports tree clamp 102 which moves towards and away from skid plate 106 by means of hydraulic cylinder 118. Tree clamp 102 moves on rollers 115 which ride in elongated track 116 and is supported by crossbeam 104 by means of a support bracket(not shown). Chain saw 160 rides in track 156 and is moved by means of hydraulic or pneumatic cylinder 150 which is attached to the skid plate 108. Piston rod 152 moves the chain saw 160 along the track 156 and against a tree. The base of the tree will be held between the tree clamp 102 and brace 105. At an upper part the tree is biased away from the crossbeam 104 by tree contacting members 126.

Figure 5:
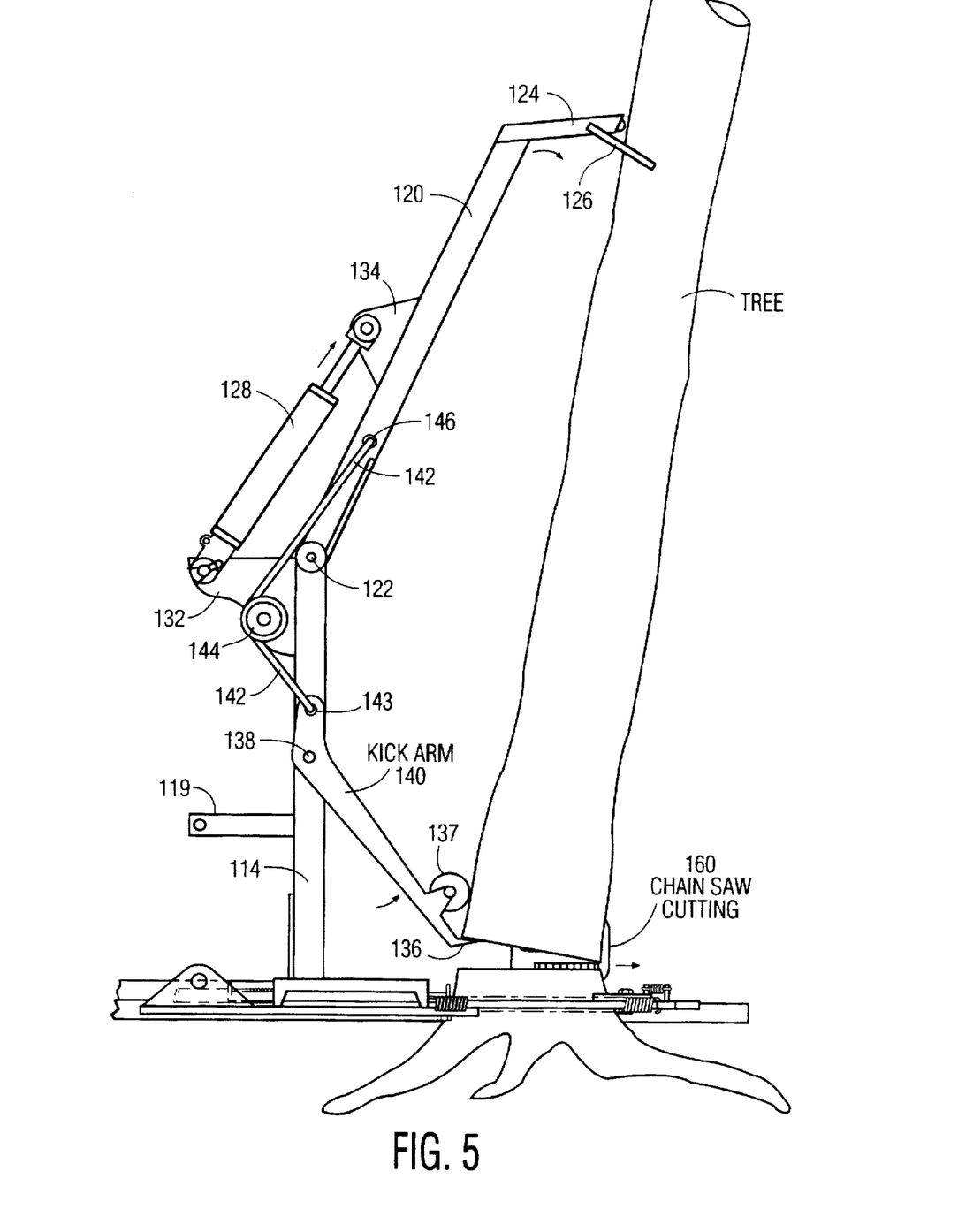
FIG. 5 is a side elevational view of the boom assembly of the tree cutter while a tree is being felled.

In FIGS. 4 and 5 the tree cutter boom assembly is shown in an elevational view and in a preferred embodiment incorporating a kick arm 140. The first boom 114 has a support brace 119 for attachment to a vehicle and is pivotably attached to the second boom at pin 122. In a preferred mode the first boom 114 carries the kick arm 140. The kick arm is pivotably attached to the first boom 114 by pin 138. Attached to the end of the kick arm at 143 adjacent to the pin 138 is a flexible cable 142 which passes over pulley wheel 144 carried by bracket 132 and is attached to the second boom 120 at 146. The lower end of the kick arm 140 has an arched tip 136 and a tree contact roller 137. The arched tip is adapted to enter the cut as a tree is being cut and felled. This holds the cut open to prevent damage to the chain saw. It also directs the tree away from the tree cutter and the operator as the tree falls. The kick arm is actuated when hydraulic cylinder 118 causes second boom 120 to put a force onto tree braces 126 which are supported by support arm 124. The hydraulic cylinder 118 is attached to the first boom by bracket 132 and to second boom by bracket 134.

FIGS. 4 and 5 also show the tree frame against the tree and the operation of the first and second booms and the kick arm 140. After actuation of the tree clamp the second boom 120 depending is moved against the tree by means of hydraulic cylinder 128. In the hydraulic mode the hydraulic cylinder 118 is actuated and clamps the tree within the tree frame. The chain saw 160 then is actuated as is seen in FIG. 5. As the tree is being cut the second boom 120 moves outwardly and downwardly. This puts a tension force on flexible cable 142 which actuates kick arm 140 to cause the arched tip end 136 to move into the tree cut. The kick arm will keep the saw from being damaged by the falling tree and will keep the tree from lurching backward toward the vehicle the tree frame and the operator. The kick arm provides a measure of safety for the operator.

After the tree is cut and felled the operator moves to another tree. This also can take place while the tree is falling. In the mechanical mode as the tractor moves away from the tree stump, trigger arm 40 moves to its original position releasing the tension on the arcuate lever 44 and on tree clamp 46. The gripping onto the tree stump is quickly released. In the hydraulic mode the operator quickly will release the grip of the tree clamp 102 onto the tree through release of the pressure in the hydraulic cylinder 118. This quick release in either the mechanical or the hydraulic modes permits the operator to fell more trees per day since no grip has to be manually actuated to release the grip onto the tree stump and to be released from the tree stump.

This preferred boom assembly can be used on either the mechanical or the hydraulic embodiments. In addition the hydraulic embodiment can also be a pneumatic mode by the substitution of the hydraulic cylinders with pneumatic cylinders. This is contemplated as an additional but not preferred embodiment of the invention. Further the hydraulic cylinders can be replaced by electric motors. This is yet a further modification and yet a further embodiment.

This tree cutter device can be modified in various ways. However, any such modifications which incorporate the various novel features and concepts of this tree cutter including the boom assembly would be within the scope of this invention.

What is claimed is:

1. A tree cutting device comprising:

a frame;

connecting device on said frame to attach said frame to a transport means;

gripping means mounted on said frame actuated when said frame is proximate to with in contact with said tree to contact and to grip at least a surface of said tree:

a first boom extending upwardly from said frame;

a second boom pivotably mounted to a an upper portion of said first boom and extending in an obtuse angle to said first boom in a direction toward said gripping means;

means at an upper end of said second boom to contact at least a surface of said tree adjacent said second boom; and a cutting device mounted on said frame and adapted to move toward and away from said tree.

2. A tree cutting device as in claim 1 wherein said gripping means is hydraulically actuated and contacts a side surface of said tree.

3. A tree cutting device as in claim 2 wherein said gripping means is an arcuate arm that is supported for lateral movement by a plurality of rollers mounted on said frame.

4. A tree cutting device as in claim 1 wherein said second boom is pivotably connected to said first boom and is at an angle of greater than 90 degrees to said first boom.

5. A tree cutting device as in claim 4 wherein said boom has means to decrease the angle of said second boom to said first boom and thereby place a force against said tree away from said first boom.

6. A tree cutting device as in claim 5 wherein the means to decrease the angle of said second boom is an hydraulic means.

7. A tree cutting device as in claim 1 wherein there is a kick arm pivotably attached to said first boom adjacent one end of said kick arm and adapted to contact said tree in the region of cutting at another end by the movement of said second boom against said tree.

8. A tree cutting device as in claim 7 wherein adjacent another end of said kick arm there is a means to connect said kick arm to said second boom.

9. A tree cutting device as in claim 8 wherein said means to connect said kick arm to said second boom is a flexible member.

10. A tree cutting device as in claim 9 wherein said flexible member passes over a guide means attached to said first boom.

11. A tree cutting device as in claim 1 wherein said gripping means has a trigger arm mounted on said frame, said trigger arm activating said gripping means upon said trigger arm contacting said tree.

12. A tree cutting device as in claim 11 wherein there is a tensioning means connecting said trigger arm and said gripping means whereby upon said trigger arm contacting said tree said griping means is actuated and upon said trigger arm being displaced from contact with said tree, the gripping force of said gripping means released.

13. A tree cutter device as in claim 12 wherein said gripping means is comprised of an arcuate lever and a clamp, said arcuate lever being attached proximate one end to said frame and proximate an other end to said clamp.

14. A tree cutter device as in claim 13 wherein said tensioning means is attached to said arcuate lever proximate said one end.

15. A tree cutter device as in claim 14 wherein said tensioning means is a spring attached to said arcuate lever between said one end and the attachment of said arcuate lever to said frame.

16. A tree cutter device as in claim 15 wherein said arcuate clamp is attached to said arcuate lever adjacent a median point of said arcuate clamp.

17. A tree cutter device as in claim 16 wherein there is a clamp tensioning means to bias said clamp toward said frame.

18. A tree cutter device as in claim 17 wherein said clamp tensioning means comprises a spring attached to said frame and to said clamp.

19. A tree cutter device as in claim 11 wherein said second boom is hingedly connected to said first boom and is at an angle of greater than 90 degrees to said first boom.

20. A tree cutter device as in claim 19 wherein said second boom has means to decrease the angle of said second boom to said first boom and thereby place a force against said tree away from said first boom.

21. A tree cutter device as in claim 20 wherein said means to decrease the angle of said second boom is a pneumatic means.

22. A tree cutting device comprising:

a frame;

connecting device on said frame to attach said frame to a transport means;

a first boom extending upwardly from said frame;

a second boom mounted to an upper portion of said first boom and extending in an obtuse angle to said first boom in a direction toward said gripping means;

means at an upper end of said second boom to contact at least a surface of said tree adjacent said second boom;

a kick arm pivotably attached to said first boom adjacent one end of said kick arm and adapted to contact said tree in the region of cutting at another end by the movement of said second boom against said tree; and a cutting device mounted on said frame and adapted to move toward and away from said tree.

23. A tree cutting device as in claim 22 wherein adjacent another end of said kick arm there is a means to connect said kick arm to said second boom.

24. A tree cutting device as in claim 23 wherein said means to connect said kick arm to said boom is a flexible member.

* * * * *